United States Patent [19]

Edwards

[11] 3,948,027
[45] Apr. 6, 1976

[54] CROP HARVESTING APPARATUS
[75] Inventor: John W. Edwards, Tampa, Fla.
[73] Assignee: Ginny Bee Harvester Corporation, LaBelle, Fla.
[22] Filed: Nov. 5, 1974
[21] Appl. No.: 521,065

[52] U.S. Cl. .......................................... 56/328 R
[51] Int. Cl.² ........................................ A01D 46/20
[58] Field of Search ........................ 56/328 R, 330

[56] References Cited
UNITED STATES PATENTS

| | | | |
|---|---|---|---|
| 3,182,827 | 5/1965 | Frost | 56/328 R |
| 3,439,481 | 4/1969 | Hall | 56/328 R |
| 3,537,245 | 11/1970 | Smith | 56/328 R |
| 3,552,107 | 1/1971 | Swift | 56/328 R |
| 3,561,205 | 2/1971 | Baker | 56/328 R |
| 3,566,594 | 3/1971 | Ellis | 56/328 R |
| 3,623,307 | 11/1971 | Richter | 56/328 R |
| 3,744,226 | 7/1973 | Granger | 56/328 R |
| 3,768,239 | 10/1973 | Staats, Sr. | 56/328 R |

Primary Examiner—Hugh R. Chamblee
Assistant Examiner—J. N. Eskovitz
Attorney, Agent, or Firm—Morton, Bernard, Brown, Roberts & Sutherland

[57] ABSTRACT

A mechanized harvester for tree borne crops. A plurality of crop harvesting heads are supported from a support station which is rotatably mounted on the end of an extendible boom. The boom, in turn, is rotatably mounted on a tractor. The support station includes an operator location from which an operator can control operation and movement not only of the crop harvesting heads and the support station but also of the tractor. Consequently, a single operator can accomplish the entire crop harvesting operation, including moving the tractor from place to place as needed, from a location which enables him to see the entire operation so that he can move the crop harvesting heads as needed to assure that all crops are harvested.

11 Claims, 5 Drawing Figures

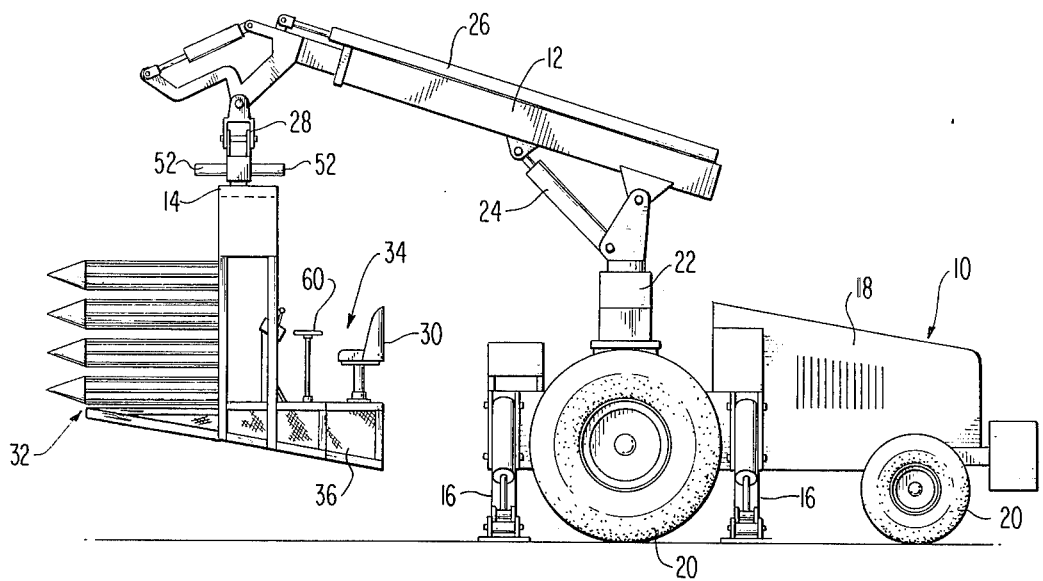
FIG.1
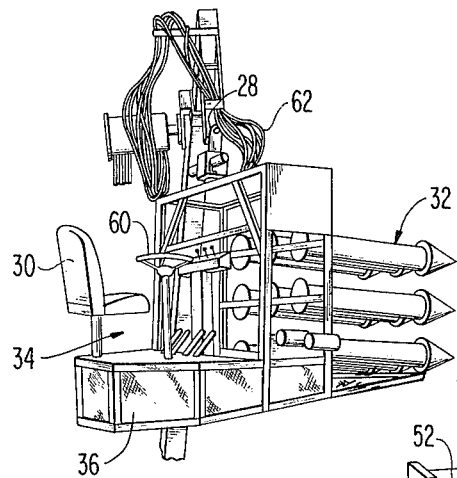
FIG.2
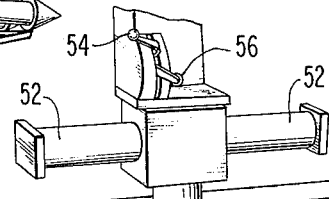
FIG.3
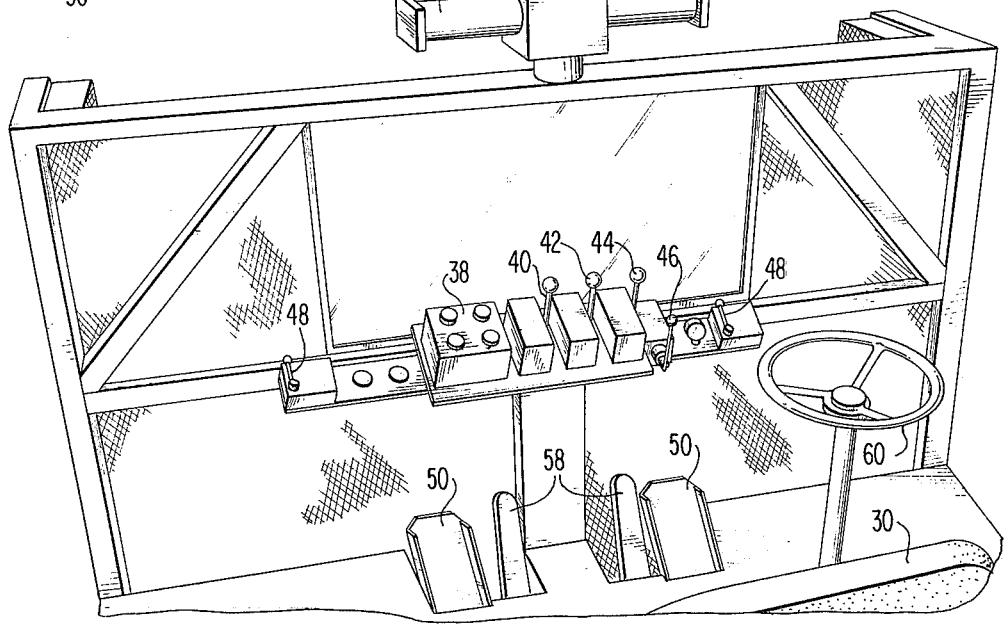

CROP HARVESTING APPARATUS

The present invention pertains to a crop harvesting apparatus. More particularly the present invention pertains to a harvester for tree borne crops, such as fruits, nuts, and the like, in which one or more crop harvesting heads are supported from a support station that includes an operator location permitting an operator to control the entire apparatus from a location immediately adjacent the crop harvesting head from which location the operator is easily able to see the entire crop harvesting operation.

At the present time many tree borne crops such as fruits and nuts are harvested by hand. Various attempts have been made to perfect a mechanized crop harvesting apparatus. Such crop harvesting apparatus are shown, for example, in numerous United States Patents such as U.S. Pat. Nos. 3,077,720, 3,040,507, 3,404,521, and 3,485,026. These various patents, as well as other patents, show crop harvesting devices in which a crop harvesting head is mounted on an elevated support station which is capable of being raised and thrust among the crop bearing foliage of a crop bearing plant. The support station is typically mounted from a tractor or other vehicle, and an operator, riding on the tractor, controls operation both of the tractor and of the crop harvesting head. While such crop harvesting devices have improved the efficiency with which tree borne crops can be harvested, it is difficult for an operator to control the harvesting of tree borne crops utilizing such a device since he is located on the tractor and so is unable to see exactly what movement is desirable to bring the crop harvesting head into contact with all of the crops.

U.S. Pat. No. 3,413,787 does show a crop harvesting device in which the crop harvesting head is mounted at the end of a boom which extends from a tractor. A basket is located adjacent the crop harvesting head so that an operator can stand at that location. The operator, however, is only capable of very limited control of the device from that location. Thus, from his location in the basket adjacent the crop harvesting head, the operator can cause the boom to move up and down and he can manually position the crop harvesting head to contact nearby crops. The operator is unable to move the boom from side to side. Consequently, when such movement is desired, it is necessary either for the operator to come down from his location adjacent the boom and move the tractor or it is necessary to have a second operator on the tractor to control that movement. Likewise, when all of the crops in a given crop bearing plant have been harvested, it is again necessary for the operator to come down from his location adjacent the crop harvesting head to move the tractor to the next crop bearing plant, thus slowing the operation considerably, or it is necessary to have a second operator to move the tractor, thus decreasing the efficiency and increasing the expense of the crop harvesting operation.

The present invention is a crop harvesting apparatus including a tractor having a boom rotatably mounted thereon, with at least one crop harvesting head mounted on a support station at the opposite end of the boom. An operator location is provided at the support station with controls for the tractor, controls for the support station, and controls for the crop harvesting head so that an operator located at that operator location can control the entire operation, including movement of the crop harvesting head, movement of the support station, and movement of the tractor.

These and other aspects and advantages of the present invention are more apparent in the following detailed description and claims particularly when considered in conjunction with the accompanying drawings. In the drawings:

FIG. 1 is a perspective view depicting a preferred embodiment of crop harvesting apparatus in accordance with the present invention;

FIG. 2 is an enlarged, fragmentary perspective view showing the support station of the embodiment of crop harvesting apparatus of FIG. 1 and illustrating the mounting of crop harvesting heads and an operator location, in accordance with the present invention;

FIG. 3 is an enlarged fragmentary view illustrating a preferred arrangement of controls at the operator location of the embodiment of FIG. 2, permitting control from that location of the tractor, the support station and the crop harvesting heads:

Figure 4:
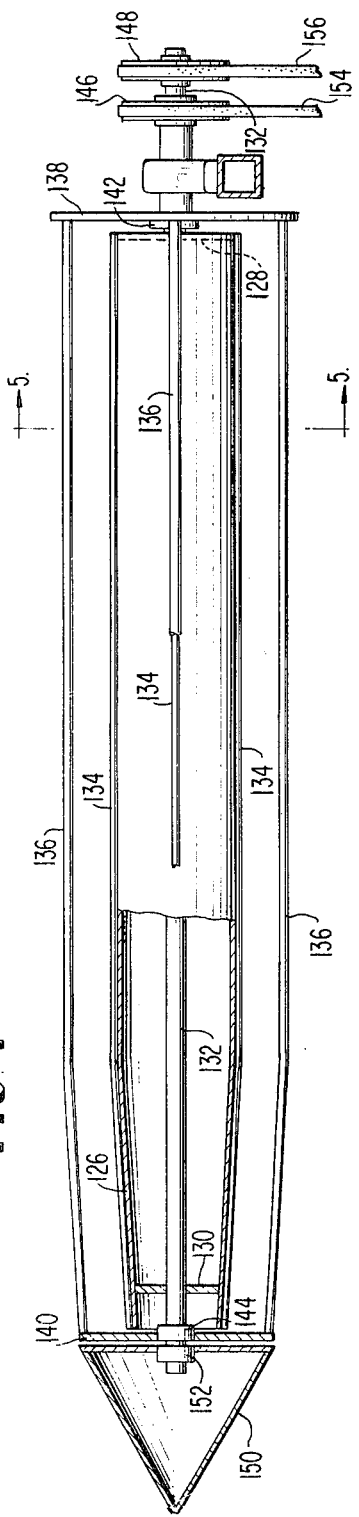
FIG. 4 is a broken, side elevational view depicting a crop harvesting head suitable for incorporation into the present invention.

FIG. 1 depicts a crop harvesting apparatus in accordance with the present invention including a tractor 10 having a boom 12 mounted thereon to rotatably mount support station 14. Tractor 10 might be a commercially available tractor, such as a Model No. 70 from Massey-Ferguson Inc. or a Case 680C from J. I. Case Co., which has been suitably modified in accordance with the present invention. Tractor 10, of course, includes the usual components necessary for movement of the tractor in the desired manner, for example an engine and a transmission within compartment 18, wheels 20 and brakes. If desired, oversized tires can be provided on wheels 20 to aid in movement on soft surfaces such as sand. Some or all of the wheels 20 can be coupled by the transmission to the engine for driving therefrom, while some or all of the wheels are steerable. Preferably, tractor 10 includes a plurality of stabilizing legs 16 to insure stability of the tractor when boom 12 is extended with support station 14 at a considerable distance from tractor 10. Preferably, also, the legs 16 are hydraulically actuated in series to assure that all the legs are in contact with the ground before pressure is applied to the ground by any one leg. For increased stability boom 12 is preferably mounted on tractor 10 between the several wheels 20. The mounting of boom 12 to tractor 10 is achieved by a rotatable mount 22 which permits boom 12 to rotate through 360° in a horizontal plane on tractor 10. In addition, boom 12 includes means such as hydraulic cylinder 24, which permits boom 12 to be raised and lowered, and means such as hydraulic cylinder 26, which permits the boom to be telescopically extended and retracted.

Support station 14 is suspended by mounting member 28 from the second end of boom 12. Mounting member 28, by way of example, might be a universal joint permitting support station 14 to hang freely from the end of boom 12 so that the support station levels itself due to its own weight. Preferably, the second end of boom 12 is angled to assure that support station 14 does not bump against the boom. If desired, shock absorbers can be provided to assure that support station 14 does not swing rapidly.

One or more crop harvesting heads 32 are mounted on support station 14 to remove crops from a crop bearing plant when the crop harvesting heads are thrust among the crop bearing foliage of the plant. Each crop harvesting head 32 might be any suitable crop harvesting head, for example one of the varieties of crop harvesting heads shown in my co-pending U.S. Pat. Application Ser. No. 410,262, filed Oct. 26, 1973, or my copending U.S Pat. Application Ser. No. 508,903, filed Sept. 24, 1974. Other crop harvesting heads which might be adapted for use as crop harvesting heads 32 are shown in the several previously mentioned United States patents.

Figure 5:
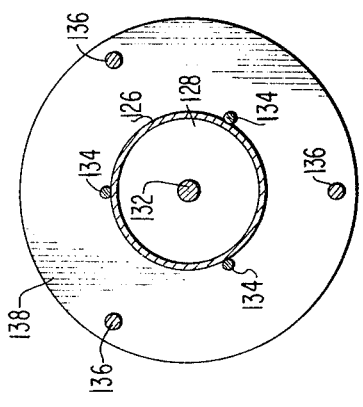
FIG. 5 is a sectional view taken along line 5—5 of FIG. 4.

FIGS. 4 and 5 illustrate a form of crop harvesting head having crop severing rods and foliage lifting rods and suitable for use as crop harvesting heads 32. Crop severing rods 134 are mounted on the outer cylindrical surfaces of rotatable cylinders 126. Foliage lifting rods 136 are mounted to rotate in paths surrounding the paths of rotation of crop severing rods 134. As seen in FIG. 4, cylinder 126 is supported on drive shaft 132 by end plate 128 and support member 130. A plurality of crop severing rods 134 are mounted on the outer cylindrical surface of cylinder 126 so that crop severing rods 134 rotate orbitally about the axis of drive shaft 132. Preferably, the forward end of cylinder 126 is slightly tapered. A plurality of foliage lifting rods 136 overlay cylinder 126, extending between rear plate 138 and forward plate 140. Foliage lifting rods 136 are, likewise, preferably tapered at their forward end. Drive shaft 132 passes through rear plate 138, being journalled therefrom by bearing assembly 142. Similarly, drive shaft 132 passes through forward plate 140 and is journalled therefrom by bearing assembly 144. Pulley 146 is mounted on bearing assembly 142 for rotation with respect to drive shaft 132. Pulley 148 is mounted on drive shaft 132. End cone 150 is mounted on the forward end of drive shaft 132, but is journalled therefrom by bearing assembly 152. Cylinder 126 and crop harvesting rods 134 are thus driven for rotation by pulley 148, while foliage lifting rods 136 are driven for rotation by pulley 146. End cone 150 is not driven by either pulley but, in practice, is likely to rotate somewhat due to slight frictional drive between drive shaft 132 and bearing assembly 152.

The several pulleys 146 and the several pulleys 148 of crop harvesting heads 32 are coupled by belts 154 and 156 to two drive sources. A first drive source is coupled by belt 156 to each pulley 148 to rotate the crop severing rods 134 at a first speed, for example a speed in the range of from about 300 to about 1000 revolutions per minute, preferably about 500 revolutions per minute. Crop severing rods 134 rotate orbitally about drive shaft 132. A second drive source is connected by belt 154 to each pulley 146 to rotate the foliage lifting rods 136 at a lower speed, for example a speed in the range of from about 30 to about 100 revolutions per minute, preferably about 50 revolutions per minute. Foliage lifting rods 136 likewise rotate orbitally about drive shaft 132 in orbits surrounding the orbits of crop severing rods 132. To harvest tree borne crops, crop harvesting heads 32 are thrust into a crop-bearing plant; and the drive sources are actuated. The rotation of foliage lifting rods 136 lifts the foliage of the crop-bearing plant. Some crops might be severed by foliage lifting rods 136. Primarily, however, the crops hang down within the arc described by rotation of foliage lifting rods 136 and are contacted by crop severing rods 134. Since crop severing rods 134 are rotating at a relatively high speed, they sever the crops. With each rotation of slower rotating foliage lifting rods 136, the foliage of the crop-bearing plant moves or shakes to insure that all crops hang down to contact and be severed by crop severing rods 134.

As seen in FIGS. 1 and 2 an operator location 34 is provided on support station 14. Consequently, an operator situated there is in a position to fully observe the harvesting of crops by crop harvesting heads 32. Operator location 34 preferably includes a seat 30 positioned to seat an operator so that he can see over crop harvesting heads 32 to observe the positioning of the crop harvesting heads for removal of all the crops from a crop bearing plant. Preferably, a crop storage basket 36 is included, for example beneath operator location 34, and the crops are stored therein as they are removed from the crop bearing plant.

Operator location 34 includes controls for controlling the operation of crop harvesting heads 32, support station 14, and tractor 10. FIG. 3 depicts one preferred arrangement of controls at operator location 34 for controlling these components. A clear, shatterproof window or shield is provided at the front of operator location 34 to assure that fruit does not get thrown into the operator station. Control box 38 includes controls for raising and lowering tractor stabilizing legs 16; control lever 40 is provided to raise and lower boom 12; control lever 42 permits the telescoping in and out of boom 12; and control lever 44 controls the rotation of boom 12 on rotatable mount 22. Control 46 is provided to control the emptying of crop storage basket 36, the bottom surface of which is hinged to swing downwardly to empty the basket. Controls 48 are provided for controlling the speed of movement of crop harvesting heads 32. One or two controls 48 might be provided, as desired, depending upon the type and the number of crop harvesting heads 32. Thus, if a large number of crop harvesting heads 32 are mounted on support station 14, a first control 48 can control speed of operation of a first group of the heads 32, while a second control 48 controls the speed of operation of the remainder. Alternatively, if crop harvesting heads 32 are of the type which include both a first group of crop severing rods and a second group of foliage lifting rods which surround the crop severing rods, one control 48 can control the speed of operation of the crop severing rods while another control 48 controls the speed of operation of the foliage lifting rods. Control pedals 50 are provided to actuate hydraulic cylinders 52 which swing support station 14 clockwise and counterclockwise, respectively, about the end of boom 12. Throttle control 54 is provided to control the speed at which the tractor engine operates. Transmission control 56 is coupled to the transmission of tractor 10. When it is desired to move tractor 10, transmission control 56 is actuated to engage the transmission, coupling the engine with the driveable wheels 20, and then throttle control 54 is utilized to control the driving of the tractor. Preferably, an automatic transmission is utilized having three control positions -- forward, neutral and reverse. Brake pedals 58 are connected to actuate the brakes on the tractor wheels, and steering wheel 60 is coupled to the steerable wheels of tractor 10 to permit steering. The several controls 38–60 are positioned for ready actuation by an operator seated at seat 30. The controls for tractor 10, including throttle control 54, transmission control 56, and brake controls 58 are preferably connected operatively in parallel with the corresponding controls situated on tractor 10 so that tractor 10 can be driven either from operator location 34 or from the usual driver location on the tractor. Electrical and hydraulic lines 62 couple appropriate ones of the controls 38–60 with appropriate power sources and components on tractor 10 to provide power and control of power for operation of picking heads 32, support station 14 and tractor 10. The design of electrical and hydraulic circuitry to accomplish this control is well within the ordinary skill of the art, and necessary design consideration can be obtained from numerous readily available sources, for example the text *Servomechanisms and Regulating System Design*, by Chestnut and Mayer, published by John Wiley & Sons, Inc., second edition 1959 and the text *Fluidics*, edited by Humphrey and Tarumoto, published by Fluid Amplifier Associates, 1965.

An operator at operator location 34 controls operation not only of picking heads 32 and support station 14 but also of tractor 10. Thus, the operator moves with support station 14 to the crop bearing foliage of the plant, and so the operator can readily observe the harvesting of the crops to assure that all crops are harvested. When a particular location of a crop bearing plant has been harvested, the operator actuates appropriate ones of the controls 40, 42, 44 and 50 to position crop picking heads 32 at another location within the plant. When the crops have been harvested from the entire plant, the operator actuates appropriate one of the controls 38–60 to move the tractor adjacent the next crop bearing plant and to position crop picking heads 32 for harvesting crops from that plant. Whenever desired, the operator actuates appropriate ones of the controls to position crop storage basket 36 over a receptacle such as a truck and then actuates control 46 to empty the harvested crops from basket 36.

It is thus seen that the crop harvesting apparatus of the present invention provides an improved device permitting more thorough and efficient harvesting of crops with the operator positioned adjacent the picking heads to observe the harvesting operation from a position in which he controls operation of the picking heads, the support station and the tractor. Although the present invention has been described with reference to a preferred embodiment, numerous modifications and rearrangements could be made, and still the result would be within the scope of the invention.

What is claimed is:

1. Apparatus for harvesting tree-borne crops comprising:
   a tractor having wheels, an engine, brakes, and a transmission for coupling the engine to at least some of the wheels to drive the tractor, at least some of the wheels being steerable;
   a boom having a first end rotatably connected to the tractor and having a second end;
   at least one crop harvesting head;
   a support station supporting the at least one crop harvesting head and rotatably connected to the boom second end, the support station including an operator location having first control means coupled to the tractor engine, transmission, brakes, and steerable wheels for controlling operation of the tractor from the support station, second control means coupled to the at least one crop harvesting head for controlling operation thereof, and third control means for controlling movement of the support station relative to the tractor.

2. Apparatus as claimed in claim 1 in which the first control means includes a throttle control for controlling the speed of operation of the tractor engine, a transmission control for controlling the coupling of the engine to the at least some of the wheels, a brake control for controlling the braking of the tractor, and a steering control for controlling steering movement of the steerable wheels.

3. Apparatus as claimed in claim 1 including a plurality of crop harvesting heads supported by the support station.

4. Apparatus as claimed in claim 1 in which the at least one crop harvesting head includes crop severing rods and foliage lifting rods and in which the second control means includes a first control member for controlling speed of operation of the crop severing rods and a second control member for controlling speed of operation of the foliage lifting rods.

5. Apparatus as claimed in claim 1 in which the third control means includes a control member for rotating the boom with respect to the tractor.

6. Apparatus as claimed in claim 1 in which the boom is an extendible boom and in which the third control means includes a control member for extending and retracting the boom.

7. Apparatus as claimed in claim 1 in which the third control means includes a control member for raising and lowering the boom.

8. Apparatus as claimed in claim 1 in which the third control means includes a control member for rotating the support station with respect to the boom.

9. Apparatus as claimed in claim 1 in which the support station includes a crop storage basket and in which the third control means includes a control member for emptying the crop storage basket.

10. Apparatus as claimed in claim 1 in which the tractor includes stabilizing legs and in which the first control means includes a control member for controlling movement of the stabilizing legs.

11. Apparatus as claimed in claim 1 in which the operator location includes an operator seat from which a seated operator can reach the controls of the first, second and third control means.

* * * * *